United States Patent [19]
McCall et al.

[11] Patent Number: 5,970,146
[45] Date of Patent: Oct. 19, 1999

[54] DATA ENCRYPTED TOUCHSCREEN

[75] Inventors: Don Charles McCall, Round Rock; David A. Biedermann, Austin, both of Tex.

[73] Assignee: Dresser Industries, Inc., Dallas, Tex.

[21] Appl. No.: 08/822,068

[22] Filed: Mar. 24, 1997

Related U.S. Application Data

[60] Provisional application No. 60/017,649, May 14, 1996.

[51] Int. Cl.$^6$ .................................................. H04K 1/00
[52] U.S. Cl. ............................... 380/24; 380/23; 380/52; 380/59; 705/16; 705/18; 705/25; 710/67
[58] Field of Search ............................. 380/24, 9, 4, 23, 380/7; 705/7

[56] References Cited

U.S. PATENT DOCUMENTS

| | | | |
|---|---|---|---|
| 4,342,883 | 8/1982 | Wernet et al. | 179/99 |
| 4,460,960 | 7/1984 | Anderson et al. | 364/200 |
| 4,870,531 | 9/1989 | Danek | 361/93 |
| 4,980,522 | 12/1990 | Murakami et al. | 200/5 |
| 5,153,589 | 10/1992 | Heys, Jr. et al. | 341/22 |
| 5,157,717 | 10/1992 | Hitchcock | 379/96 |
| 5,297,202 | 3/1994 | Kapp et al. | 380/9 |
| 5,331,508 | 7/1994 | Hosoi et al. | 361/680 |
| 5,335,141 | 8/1994 | Hosoi | 361/680 |
| 5,418,684 | 5/1995 | Koenck et al. | 361/680 |
| 5,448,446 | 9/1995 | Honda et al. | 361/680 |
| 5,457,305 | 10/1995 | Akel et al. | 235/379 |
| 5,491,651 | 2/1996 | Janik | 364/708.1 |
| 5,654,701 | 8/1997 | Liao et al. | 341/22 |
| 5,768,386 | 6/1998 | Yokomoto et al. | 380/24 |

Primary Examiner—Tod R. Swann
Assistant Examiner—Paul E. Callahan
Attorney, Agent, or Firm—Haynes and Boone, LLP

[57] ABSTRACT

A secure touchscreen is provided, comprising a touchscreen and touchscreen controller for receiving inputs, a system controller, an encryption module and two external buses. The controller, system controller and encryption module are embedded in a mass of material to prevent unauthorized access of the inputs. Furthermore, the first external bus is used to operate and communicate with an external system in an encrypted mode, while the second external bus is used to operate and communicate with the external system in a normal mode.

9 Claims, 1 Drawing Sheet

DATA ENCRYPTED TOUCHSCREEN

CROSS REFERENCE

This application claims the benefit of U.S. Provisional Application No. 60/017,649, filed May 14, 1996.

BACKGROUND OF THE INVENTION

This invention relates to a computer interface and, more particularly, to a secure touchscreen input device into which a user may enter proprietary codes such as personal identification numbers (PINs).

People must commonly interface with computers and other processors in a proprietary manner to transact business, transfer proprietary information, log on to a network, and perform other proprietary activities. As a preliminary security measure, the user is typically required to enter a PIN. For example, with reference to monetary transactions, PINs commonly must be entered into a processor, via a keypad, to authorize the use of an automatic teller machine (ATM) card to withdraw cash from an ATM, or to authorize use of a credit card to purchase gasoline from a self-service gasoline dispenser or to purchase food and the like from a grocery store.

In the foregoing examples, the user is required to enter the PIN into a keypad operatively connected to a card reader or other input device which reads proprietary user information magnetically encoded onto the ATM card, credit card, or the like. The card reader and keypad are operatively connected for communicating the magnetically encoded information, along with the PIN, to a network of banks and credit card companies. To provide further security, the PIN is encrypted immediately from the keypad and before it is communicated onto the network. If PINs, particularly encrypted PINs, were not utilized, credit cards, ATM cards, and the like, or information magnetically encoded thereon could be misappropriated and used without proper authority.

Though PINs reduce unauthorized use of credit cards and ATM cards, PINs may be misappropriated by electronically eavesdropping for a PIN entered into a keypad. Such eavesdropping, however, requires that the PIN be intercepted before it is passed to, and encrypted by, a processor in preparation for transmission onto the network. To curb such interception and any tampering of the keypad and processor, the processor is typically embedded in a mass of material such as a two-part epoxy resin which is potted to the keypad, thereby integrating the keypad and processor into a single module.

As the technology for using encrypted PINs has advanced, interfaces with computers and other processors have advanced as well. One such advancement is the combination of graphics displays and touchscreen technology, hereinafter "interactive display." Many of the same business transactions, information transfers, network log-ons, and proprietary activities mentioned above now utilize interactive displays. In so doing, the interface between the computer and user is becoming more friendly, informative, and adaptable. Furthermore, the interface between the computer and user is focused on a single area, i.e., the immediate area of the interactive display.

Clearly, the advantages of interactive displays are numerous, however interactive displays have some drawbacks. One such drawback is that the touchscreen portion of the interactive display cannot provide the encryption security for PINs like the keypads described above. As a result, modern interactive displays still require a separate keypad to encrypt the user PINs. The use of the separate keypad contradicts some of the benefits of the interactive display. For example, when entering a PIN, a user must focus his attention away from the immediate area of the interactive display and search for the keypad. To minimize this, many interactive displays have the keypad located directly adjacent to the graphics display, but as a result, either the size of the interactive display area is reduced, or the size of the entire area used for the user interface is made undesirably large.

Therefore, what is needed is a interactive display that includes a touchscreen capable of a high level of security and data encryption.

SUMMARY OF THE INVENTION

It is therefore an object of the present invention to provide a touchscreen capable of a high level of security and data encryption. To this end, a secure touchscreen is provided, comprising a touchscreen and touchscreen controller for receiving inputs, a system controller, an encryption module and two external buses. The controller, system controller and encryption module are embedded in a mass of material to prevent unauthorized access of the inputs. Furthermore, the first external bus is used to operate and communicate with an external system in a normal mode, while the second external bus is used to operate and communicate with the external system in an encrypted mode.

A technical advantage achieved with the present invention is that it provides a touchscreen interface that works in a normal manner, and also works in an encrypted, secure manner.

BRIEF DESCRIPTION OF THE DRAWINGS

The above object and summary, as well as further objects, features and advantages of the present invention will be more fully appreciated by reference to the following detailed description of the presently preferred, but nevertheless illustrative, embodiments of the present invention when taken in conjunction with the accompanying drawings wherein.

DESCRIPTION OF THE PREFERRED EMBODIMENTS

Figure 1:
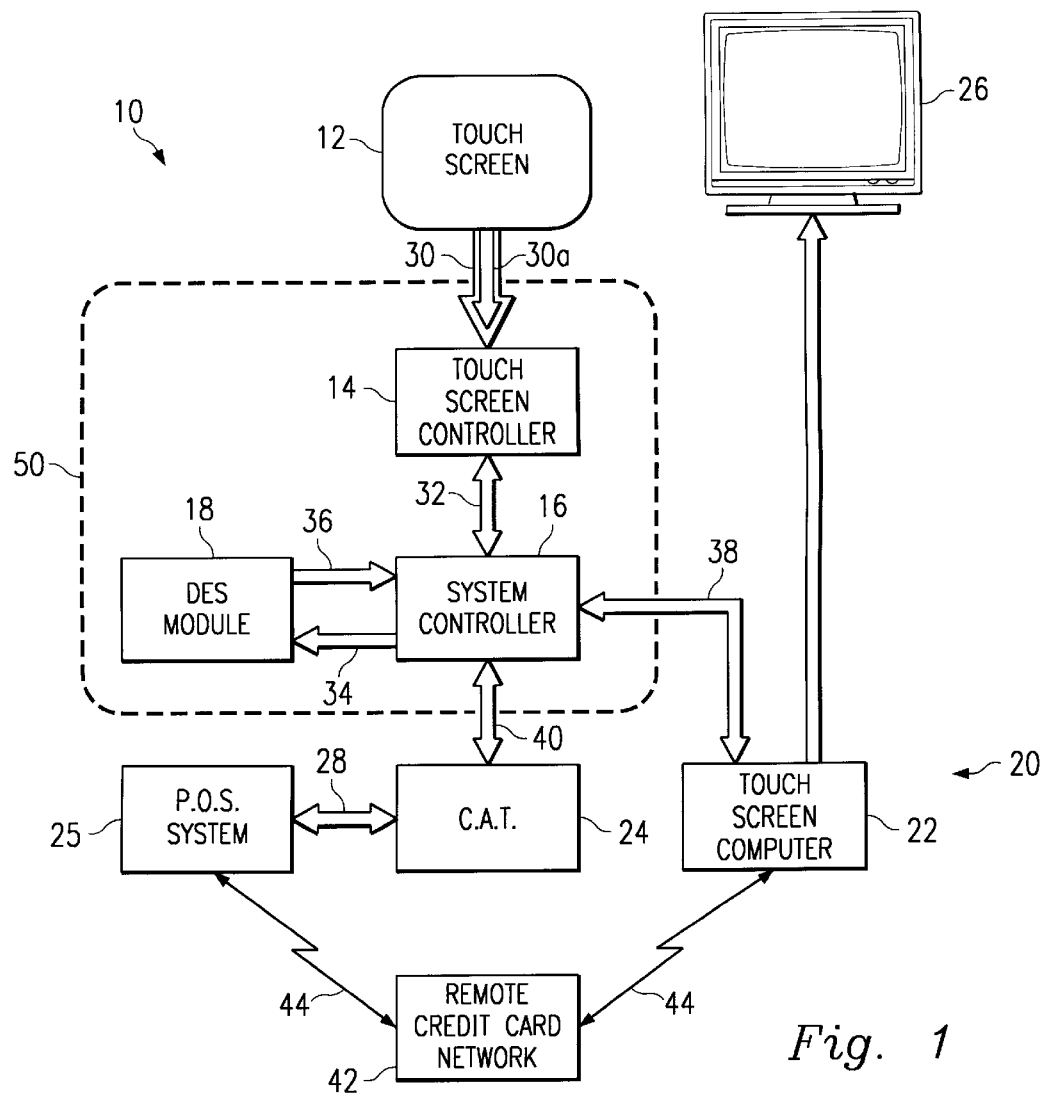
FIG. 1 is a block diagram of the secure touchscreen of the present invention.

Referring to FIG. 1, the reference numeral 10 refers to the secure touchscreen system of the present invention, hereinafter "STS." The STS 10 includes a touchscreen 12, a touchscreen controller 14, a system controller 16, and a data encryption ("DES") module 18. The STS 10 provides an interface between a user (not shown) and a computer system 20. The computer system 20 includes a touch screen computer 22, a customer activated terminal ("CAT") 24, and a point of sale ("POS") system 25.

The preferred embodiment incorporates many components commonly used in other applications. For example, the touchscreen 12 and touchscreen controller 14 are conventional devices such as those manufactured by Carroll Touch, Elo-Touch and Micro Touch and the system controller 16 is a conventional microprocessor which is primarily used to control where signals are routed. Therefore, because the physical hardware of the touchscreen 12, the touchscreen controller 14, and the system controller 16 are well known in the art, the hardware details of these devices will not be further discussed. In addition, the DES module 18 is functionally similar to the DTRSM module described in detail in commonly-assigned, copending U.S. Pat. No. 5,654,701 entitled DETACHABLE TAMPER RESISTANT SECURITY MODULE, which is hereby incorporated by reference in its entirety.

The computer system 20 also incorporates components used in other applications. The touchscreen computer 22 is a conventional computer that includes graphics capabilities to communicate with a conventional graphics display unit 26. Likewise, the CAT 24 and POS 25 are conventional devices. The CAT 24 communicates with a user through many input and output devices, including a card reader and receipt printer (not shown). The POS 25 can be one of many controllers, such as the Wayne Plus Model 3 controller. Furthermore, the CAT 24 and POS 25 communicate with each other through an RS485 bus 28. Because the physical hardware of the touch screen computer 22, the CAT 24, the POS 25 and the graphics display unit 26 are well known in the art, the hardware details of these devices will not be further discussed.

The touchscreen 12 communicates with the touchscreen controller 14 through a touchscreen bus 30. Likewise, the touchscreen controller 14 communicates with the system controller 16 through an RS232 bus 32. The system controller 16 serves as a communications hub for the remaining components by communicating with the DES module 18 through a keypad matrix bus 34 and an RS485 bus 36, with the touchscreen computer 22 through a second RS232 bus 38, and with the CAT 24 through a second RS485 bus 40. It is also understood that electrical operating power is conventionally supplied to each component of the STS 10.

The touchscreen controller 14, system controller 16, and DES module 18 are attached, to the touchscreen 12 in a tamper resistant manner by a tamper resistant attachment device, represented generally by reference numeral 50. The epoxy mass 50 may be attached to the touchscreen 12 in a number of ways. For example, the tamper resistant attachment device 50 may be attached directly to the touchscreen 12, thereby providing a secure connection. Another way is to have the touchscreen bus 30 made of stainless steel cable 30a connected with permanent pin connections or rivets. As a result, the only means of communication with the STS 10 is through the RS232 bus 38 and the RS485 bus 40. Furthermore, it is understood that the tamper resistant attachment device 50 may be formed of a conventional two-part epoxy resin, and the touchscreen controller 14, system controller 16, and DES module 18 are embedded therein using techniques well-known in the art. Although not shown, additional techniques can be utilized to further secure the components stored therein. For example, the tamper resistant attachment device 50 may include an erase feature to the system controller 16 that activates if the connection to the touchscreen is ever broken.

The STS 10 and the computer system 20 can operate in a normal mode and an encrypted mode. In the normal mode, the touchscreen computer 22 sends video data to the display 26, prompting the user to supply input data by touching specific portions of the touchscreen 12. At the same time, the system controller 16 receives a map of touch coordinates from the touchscreen computer 22 through the RS232 bus 38 to interpret the user inputs. The touchscreen 12 receives the user inputs and transfers it to the touchscreen controller 14 through the touchscreen bus 30. The touchscreen controller 14, operating in a conventional manner, converts the user inputs to touchscreen coordinates and transfers the touchscreen coordinates to the system controller 16 through the RS232 bus 32. The system controller 16 compares the touchscreen coordinates with the map of touch coordinates and creates input data, which is routed to the touchscreen computer 22 through the RS232 bus 38.

The encrypted mode is initiated by communications from the CAT 24. The STS 10 is coupled, via the CAT 24, to an ATM card or credit card reader (not shown, but well known in the art). The CAT 24, is also connected to a credit card network 42, for example, banks and credit card companies, through the POS system 25 and a phone line 44. Whenever the user passes his card through the card reader and the card reader "reads" information magnetically encoded thereon such as the user's bank and account number, the CAT 24 sends an encryption request to the system controller 16 through the RS485 bus 40. Upon receipt of the encryption request, the system controller 16 notifies the touchscreen computer 22 that a card has been read and then the system controller 16 disables all other processing and/or information transfers with the touchscreen computer 22.

Figure 2:
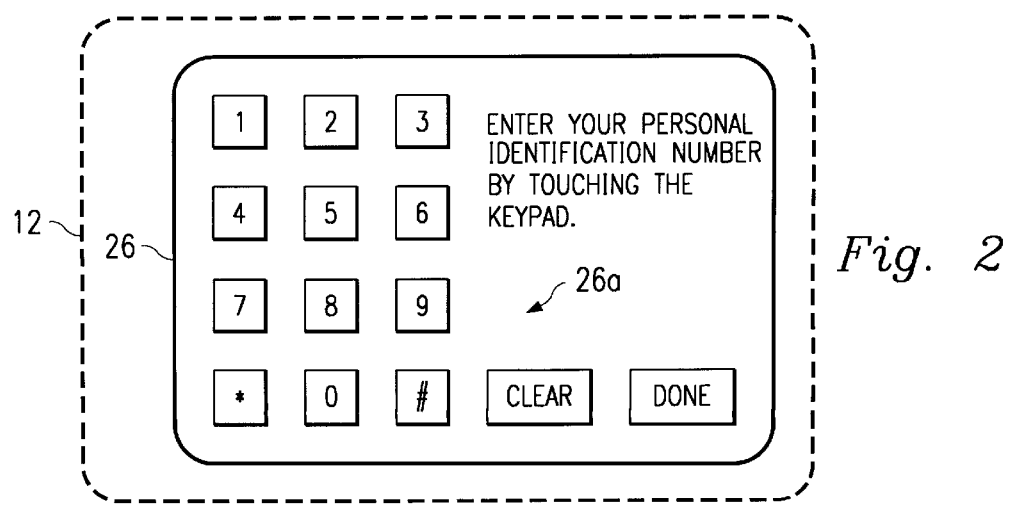
FIG. 2 is an illustration of the display device of the secure touchscreen of FIG. 1.

Referring also to FIG. 2, in response to being notified that a card has been read, the touch screen computer 22 sends commands to the graphics display 26 to display a video keypad image 26a. At the same time, the system controller 16 sends a video keypad map 12a (which corresponds with the video keypad image 26a) to the system controller 16 through the RS232 bus to received the user's PIN. The user then enters his PIN by depressing portions of the touchscreen 12 corresponding to the video keypad image 26a. The touchscreen controller 14 returns touchscreen coordinates for the un-encrypted PIN to the system controiler 16, which interprets them using the video keypad map to produce the un-encrypted PIN. The system controller 16 then routes the un-encrypted PIN to the DES module 18 through the keypad matrix bus 34. The DES module 18 encrypts the PIN, and sends the encrypted PIN back to the system controller 16 through the RS485 bus 36. The encrypted PIN is then sent to the CAT 24 through the RS485 bus 40, which routes the encrypted PIN to the POS 25 and to the credit card network 42. When the PIN has been entered and delivered to the CAT 24, the system controller 16 reverts to normal mode and restores communications to the touchscreen controller 22 over the bus 38.

In an alternate embodiment, the system controller 16 can maintain communications with the touchscreen computer 22 throughout the encrypted mode. In this manner, the system controller 16 can alternatively route the encrypted pin through the touchscreen computer 22 through the RS232 bus 38 and to the remote credit card network 42 through a phone line 46.

It is understood that several variations and additions may be made to the foregoing within the scope of the invention. For example, additional security measures may be taken to determine whether the STS 10 has been tampered with. In particular, security tabs may be connected to the epoxy mass 50, and/or a tamper-evident label, such as tape having a unique design (i.e., one that is difficult to duplicate) and which does not re-adhere once removed, may be adhered to the touchscreen 12. Any disassembly and/or altering of the STS 10 will then be evident by a broken security tab and/or a broken or removed label. Therefore, it is understood that other variations in the present invention are contemplated and in some instances, some features of the invention can be employed without a corresponding use of other features. Accordingly, it is appropriate that the appended claims be construed broadly in a manner consistent with the scope of the invention.

What is claimed is:

1. A secure touchscreen system, comprising;

a touchscreen for receiving user inputs;

tamper resistant means including a system controller and an encryption module for processing the user inputs, the touchscreen being securely connected to the system controller for passing the user inputs from the touchscreen to the system controller;

a first bus connectable to the system controller for receiving the user inputs in a normal mode; and a second bus connectable to the system controller for activating the encryption module and for receiving the user inputs in an encrypted mode.

2. The system of claim 1 wherein the connection between the system controller and the touchscreen utilizes a stainless steel bus.

3. The system of claim 1 wherein the first bus is also connectable to the system controller for receiving the user inputs in an encrypted mode.

4. A secure touchscreen system, comprising;

a touchscreen for receiving user inputs;

a system controller securely connected to the touchscreen so that a user input coming from the touchscreen can not be easily intercepted;

an encryption device securely connected to the system controller so that the user input can be transferred from the system controller to the encryption device without being easily intercepted; and a bus connectable to the system controller for receiving the user inputs in either a normal mode or an encrypted mode.

5. The system of claim 4 wherein the system controller and the encryption device are secured with an epoxy mass.

6. The system of claim 4 wherein the system controller and the encryption device are secured with stainless steel.

7. The system of claim 4 wherein the system controller and the encryption device are secured with tamper-evident label.

8. The system of claim 4 wherein the system controller and the encryption device are secured by an erase input of the system controller that is activated whenever the system is altered.

9. The system of claim 1 wherein the system controller includes a touchscreen controller.

* * * * *